United States Patent

Chen et al.

(10) Patent No.: US 7,539,381 B2
(45) Date of Patent: May 26, 2009

(54) LOW BEND LOSS COATED OPTICAL FIBER

(75) Inventors: Xin Chen, Corning, NY (US); Joohyun Koh, Painted Post, NY (US); Ming-Jun Li, Horseheads, NY (US); Anping Liu, Big Flats, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 19 days.

(21) Appl. No.: 11/801,896

(22) Filed: May 11, 2007

(65) Prior Publication Data

US 2008/0279516 A1 Nov. 13, 2008

(51) Int. Cl.
*G02B 6/02* (2006.01)
(52) U.S. Cl. .................. 385/124; 385/126; 385/127; 385/145
(58) Field of Classification Search ......... 385/123–124, 385/126–128, 141, 144–145
See application file for complete search history.

(56) References Cited

U.S. PATENT DOCUMENTS

| | | | |
|---|---|---|---|
| 6,314,225 B1 | 11/2001 | Wang | 385/123 |
| 6,503,421 B1 | 1/2003 | Wang et al. | 252/582 |
| 6,603,901 B1 * | 8/2003 | Hale et al. | 385/37 |
| 7,239,785 B2 | 7/2007 | DeMartino et al. | 385/128 |
| 2005/0062181 A1 * | 3/2005 | Walker | 264/1.24 |

OTHER PUBLICATIONS

M. Heiblum et al, "Analysis of Curved Optical Waveguides by Conformal Transformation", IEEE Journal of Quantum Electronics, vol. QE-11, No. 2, pp. 75-83, Feb. 1975.
M. Heiblum et al, "Correction to "Analysis of Curved Optical Waveguides by Conformal Transformation"", IEEE Journal of Quantum Electronics, vol. QE-11, No. 2, pp. 313, Feb. 1975.
Y. Tsuchida et al, "Design and characterization of single-mode holey fibers with low bending losses", Optics Express, vol. 13, No. 12, pp. 4770-4779, Jun. 13, 2005.
Q. Wang et al, "Theoretical and experimental investigations of macro-bend Losses for standard single mode fibers", Optics Express, vol. 13, No. 12, pp. 4476-4484, Jun. 13, 2005.
J. Yamauchi et al, "Analysis of bent step-index optical fibres by the beam propagation method", IEE Proceedings-J, vol. 139, No. 3, pp. 201-207, Jun. 1992.
J. Jin, *The Finite Element Method in Electromagnetics*, Second Edition, © 2002, John Wiley & Sons, Inc., New York, pp. 375-395.

* cited by examiner

*Primary Examiner*—Frank G Font
*Assistant Examiner*—Michael P Mooney
(74) *Attorney, Agent, or Firm*—Robert L. Carlson

(57) ABSTRACT

An optical fiber includes a core and a cladding, said cladding having a refractive index $n_c$ a first coating directly contacting the cladding of said fiber, said coating having a thickness of less than 10 microns, said coating having a refractive index delta %=$100 \times (n_i^2 - n_c^2)/2n_i^2$ less than $-1$ percent. In another aspect, an optical fiber includes a core and a cladding, said cladding having a refractive index $n_c$, a first coating directly contacting the cladding of said fiber, said fiber comprising a glass diameter less than 100 microns, said coating having a thickness of at least 8 microns, said coating having a refractive index delta %=$100 \times (n_i^2 - n_c^2)/2n_i^2$ less than $-1$ percent.

20 Claims, 2 Drawing Sheets

LOW BEND LOSS COATED OPTICAL FIBER

BACKGROUND OF THE INVENTION

1. Field of the Invention

The present invention relates generally to optical fibers, more particularly to optical fibers having low index of refraction coatings thereon.

2. Technical Background

Glass optical fibers with improved bend loss properties have recently been of significant interest in the telecommunications field. Techniques for improving fiber bending properties can play important roles in many types of fibers, including transmission fibers used in long distance, single mode and multimode fibers used in the emerging area of fiber to the home applications, and dispersion compensation fibers where bending loss has limited many designs from practical use. In certain applications such as fiber to the home applications, the ability to form a tight bending diameter of 20 mm or less is desired with negligible bending loss. Many of the proposed solutions for this problem involve significant modification of the fiber refractive index profile.

SUMMARY OF THE INVENTION

One aspect of the present invention relates to an optical fiber comprising a first coating directly contacting said fiber, said coating having a thickness of less than 10 microns, said coating having a refractive index delta less than −0.5 percent, more preferably less than −1.0 percent, and even more preferably less than −1.5 percent. Preferably, the first coating comprises a thickness of less than 7 microns, more preferably less than 5 microns.

Another aspect of the present invention relates to an optical fiber comprising a first coating directly contacting said fiber, said fiber comprising a glass diameter less than 100 microns, said coating having a thickness of at least 10 microns, said coating having a refractive index delta less than −0.5 percent, more preferably less than −1.0 percent, and even more preferably less than −1.5 percent. In some embodiments, the fiber exhibits a glass diameter less than 90 microns. In some embodiments, the coating exhibits thickness of at least 20, and in some cases at least 30 microns. In another embodiment, the coating thickness may be between about 10 and 30 microns. In some preferred embodiments, the core is single moded at at least one wavelength selected from the group consisting of 850, 1060, 1310, and 1550 nm. In some other embodiments, the core is multi-moded at at least one of these wavelengths.

One preferred class of low index coating, which may be employed in any of the embodiments described herein, is fluorinated maleimide copolymers such as a terploymer containing N-halogenated phenyl maleimide unit or N-halogenated phenyl bismaleimide unit, one or more second units selected from the group consisting of halogenated acrylates, halogenated styrenes, halogenated vinyl ethers, halogenated olefins, halogenated vinyl isocyanates, halogenated N-vinyl amides, halogenated allyls, halogenated propenyl ethers, halogenated methacrylates, halogenated maleates, halogenated itaconates, and halogenated crotonates and one or more third units comprising a monomer containing both a free radically polymerizable group and cationic ring opening polymerizable group. The terploymer may be prepared by radical co-polymerization prior to being applied to the fiber. Each building block in the terpolymer plays a different role in the low refractive index coating material. In general, N-halogenated maleimide provide a higher glass transition temperature, higher surface energy, and higher tensile strength and higher than some other comonomers. The relative molar concentration of N-halogenated phenyl maleimide and fluorinated comonomer determined the final refractive index, and the third comonomer such as glycidial methacrylate will offer the cationic ring open mechanism after polymer was prepared by radical copolymerization of terpolymers. For example, the typical terpolymers of refractive index between 1.38-1.43 were synthesized by radical copolymerization of N-pentafluorophenyl maleimide, heptdecafluorodecyl acrylate, and glycidyl methacrylate in the chlorobenzene or cyclohexanonone solution at 130° C. The final terpolymers consist of 20-40% molar of N-pentafluorophenyl maleimide, 60-40% molar of heptadecafluorodecyl acrylate of and 20% molar of glycidyl methacrylate based on the $C^{13}$ NMR analysis. These materials are preferred because they are very suitable to be coated in a thin layer, exhibiting high surface tension when applied to glass optical fiber, thus facilitate wetting of the coating to the glass surface, enabling the coatings to be applied in thin (e.g. 3-15 um thick layers). Such coating materials are further described, for example, in U.S. Pat. Nos. 6,314,225 and 6,503,421, the specifications of which are hereby incorporated by reference in their entirety. These patents describe how to make fluorinated maleimide copolymers having low refractive index and high surface energy. High surface energy enables the coatings to be applied to glass optical fibers in thin (e.g. less than 10 microns thick) coatings. Depending on the concentration of polymer in solution, a thin film of thickness of the core of single mode fiber (3-9 microns, refractive index between about 1.39 and 1.43 at 1550 nm) can be applied to the optical fiber via a UV curing process.

The use of a layer of coating adjacent the outermost glass cladding of the optical fiber such that the coating exhibits a negative refractive index delta relative to the refractive index delta of the cladding of the optical fiber results in a number of advantages over prior art fiber coatings. For example, the macrobend performance of the fiber can be improved significantly, such fibers exhibiting a 20 mm macrobend induced loss less than 0.12 dB/turn (or 1.85 dB/m), more preferably less than 0.058 dB/turn (0.93 dB/m), and even more preferably less than 0.029 dB/turn (0.47 dB/m) at 1550 nm. Thus, the fibers disclosed herein can have a 20 mm bend performance which is a factor of 5 improvement compared to some currently available standard single mode fibers. Preferably, the refractive index delta of the coating which contacts the outer glass cladding is at less than or equal to −0.5 percent, more preferably less than or equal to −1.0 percent, and most preferably less than or equal to −1.5 percent delta (delta being calculated with respect to the cladding refractive index). Preferably, the low index coating directly contacts the glass cladding of the optical fiber. If additional and more conventional coating layers are applied, i.e., such as a conventional primary or secondary coating, these layers are preferably applied over the negative refractive index delta coating. Optically, the negative delta coating enables the reduction of fiber macrobending loss yet does not require elaborate refractive index profile modifications to the optical fiber. Therefore these coatings can be applied to already existing fibers without having to modify the refractive index or properties of the fiber substantially, except that bend induced losses are reduced.

The low index coatings disclosed herein can be utilized on already existing fiber designs, and consequently bending properties can be improved without modifying the refractive index profile which determines the bulk of the fiber properties. The proposed low index coatings can therefore be used with many fiber products, including both transmission fiber products and multimode fiber products. Enhancing the fiber bending properties can broaden the use of existing fibers, both single mode and multimode, for critical applications such as FTTH applications.

Further, the low index coating described herein can be applied very cost effectively and without affecting the existing functions of the more conventional fiber coatings which may be applied over the low index coating.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

Figure 1:
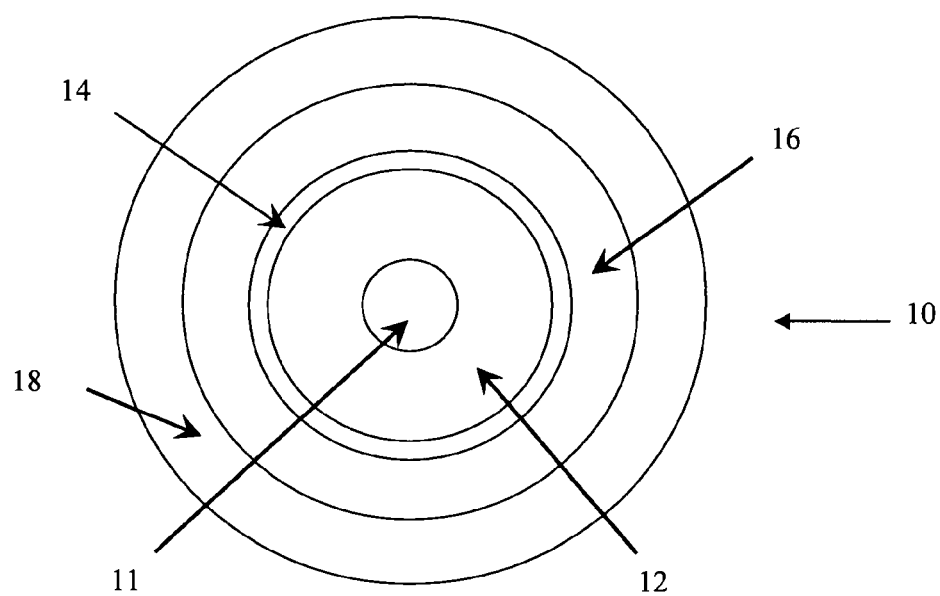
FIG. 1 shows a cross-sectional view of an optical fiber with a coating in accordance with the invention and a conventional primary and secondary coating.

As used herein, refractive index is expressed as delta or "relative refractive index percent", and is defined as $\Delta\% = 100 \times (n_i^2 - n_c^2)/2n_i^2$, where $n_i$ is the maximum refractive index in region i, unless otherwise specified, and $n_c$ is the refractive index of the non-down doped portion of the cladding region (for example, outer clad region 16 in the embodiment illustrated in FIG. 1.

The 10, 15, and 20 mm microbend tests consist of wrapping the fiber 5 times around a 10, 15, and 20 mm mandrel, respectively, and calculating the induced attenuation (i.e. the increase in attenuation) per turn or per meter caused by wrapping the fiber around the mandrel. Unless otherwise specified, these measurements are taken at 1550 nm.

FIG. 1 shows the cross section of a coated optical fiber 10 in accordance with the invention. The glass fiber core 11 is located at the center of the optical fiber 10, and is surrounded by a glass cladding 12, which in most cases is formed of pure silica. Outside the cladding 12 are layers of organic coatings that are used to protect the optical fiber. In the embodiment illustrated, coating 14, which is applied directly onto the glass cladding of the optical fiber, comprises a lower refractive index than that of the glass cladding. Preferably, the refractive index delta of coating layer 14 is less than −1.0 percent. Optical coating layer 16 which may be the equivalent of what normally is known as a conventional primary coating material, i.e., formed of very soft polymer materials, while coating layer 18 may be the equivalent of what normally is known as a conventional secondary coating material, i.e, formed of harder polymer materials.

Thus, the optional primary coating 16 preferably exhibits a Young's modulus less than 200 MPa, more preferably less than 50 MPa, and most preferably less than 10 MPa and secondary coating 18 preferably exhibits a Young's modulus greater than 500 MPa, more preferably greater than 700 MPa, and most preferably greater than 900 MPa. Such primary and secondary coatings are commercially available in the form of UV curable urethane acrylate coating materials. Typically, the primary role of protective coatings which are applied to optical fibers is to isolate the fiber from the outside environment, and prevent damage to the optical fiber. Because typical conventional optical fibers employ a refractive index which is greater than that of the glass optical fiber cladding, such fiber coatings typically also serve to strip unwanted cladding modes. A cladding mode is a mode that is confined to the cladding of an optical fiber by virtue of the fact that the cladding has a higher refractive index than the surrounding medium, which is either air or the primary polymer overcoat. These modes are generally undesired. Conventional optical fibers have a primary polymer overcoat with a refractive index that is higher than that of the cladding, so that light propagating in the cladding is rapidly attenuated and disappears after only a few centimeters of propagation. Cladding modes are particularly susceptible to leaking out from the glass fiber core when the optical fiber is bent. If these modes which sometimes leak out from the core were allowed to propagate within the coatings of the optical fiber, they could leak back into the optical fiber and potentially interrupt the efficiency of the mode beam which otherwise is meant to propagate within the core of the optical fiber. However, due to the higher index of refraction and extremely high attenuation typical exhibited by these coatings, these modes tend to leak out of the coating and/or attenuate almost as soon as they leak out of the glass cladding into the organic coating region. Consequently, preferably the low index coating 14 is applied in a thin coating so as to enable any modes which leak out of the fiber cladding 12 to continue out of the optical fiber 10. The refractive indices of both the two outer coating layers 16 and 18 are preferably chosen to be higher than that of the inner cladding 14 so that no cladding mode can survive over any meaningful distance. In particular, the primary coating 16 exhibits a delta greater than 1 percent, more preferably greater than 2 percent, and typically about 2.35% and the secondary coating 18 exhibits a delta of greater than 2 percent, more preferably greater than 4 percent, and typically about around 5 percent.

Figure 2:
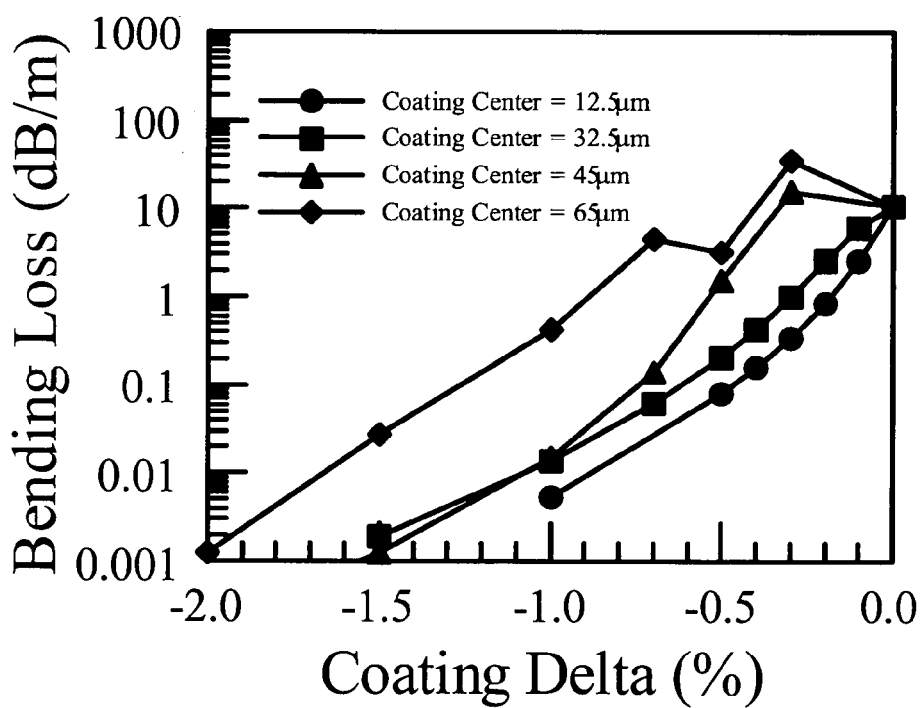
FIG. 2 illustrates bending loss in dB/m versus coating delta for a low index coating 14 applied to a variety of optical fiber thicknesses and coating 14 thicknesses.

FIG. 2 illustrates modeled bending loss in dB/m versus coating delta for a low index coating 14 applied to a variety of optical fiber thicknesses and coating 14 thicknesses. In each case, the glass optical fiber was standard single mode (SMF-28® fiber) fiber with a core radius of about 4.2 microns and relative refractive index delta of about 0.35 percent, and the cladding thickness was varied to vary the distance of the coating 14 from the core 11 of the optical fiber 10. In each case the fiber was bent around a 20 mm diameter mandrel, and bend loss was calculated as a function of coating 14 delta for four coating center positions, namely 12.5, 32.5, 45, and 65 microns from the core of the optical fiber, the coating thickness in each case being 5 microns. In other words, these coatings exemplify application of the coating 14 onto glass optical fibers having outer glass cladding diameters of 20, 60, 85, and 125 microns, respectively. As can be seen in the data illustrated in FIG. 2, at a coating distance from the core of 12.5 microns, the ability of a lower index coating to reduce bending loss increases quickly as the index of the coating 14 decreases. In particular, a ring delta of −0.5 percent is sufficient to provide significant improvement to the bend performance on a fiber having a diameter of about 20 microns. As can be seen in FIG. 2, as the coating is moved further from the core 11 of the optical fiber 12, a lower coating 14 delta is needed to achieve the same relative amount of bend performance improvement. For example, compared to the 12.5 micron center coating data, the fibers having a 32.5 micron coating center needed slightly lower index to achieve the same amount of bending improvement. In all cases, however (even for coating centered around 45.0 microns and 65.0 microns) bending performance was significantly improved with coating 14 having deltas below about −0.5 percent and even more improved bend properties were achieved with deltas of less than −1.0 and less than −1.5 percent.

Figure 4:
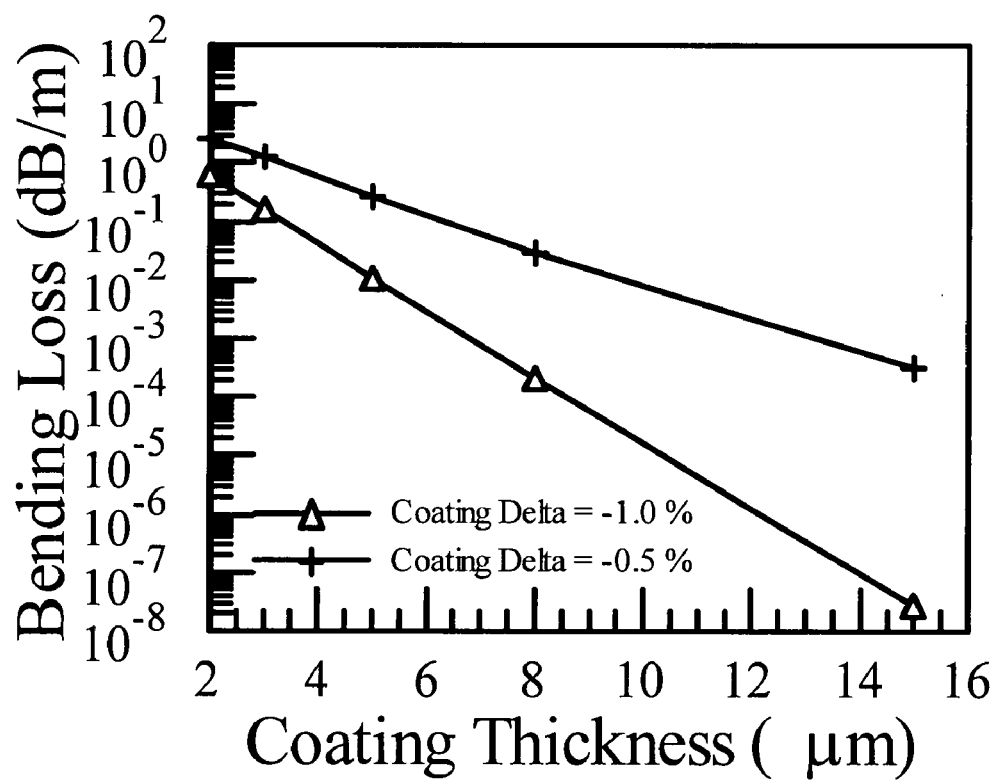
FIG. 4 illustrates bend loss as a function of two coatings having different relative refractive indices.

FIG. 4 illustrates bending loss as a function of coating thickness for two coatings having different relative refractive indices. In each case the coating was applied directly onto a fiber cladding, the fiber having a diameter of 80 microns, a core delta of 0.35% and radius of 4.2 microns (similar to standard single mode fibers). The fiber bending diameter is 20 mm. As can be seen in FIG. 4, as the low index coating becomes thicker, bend loss decreases linearly when the bending loss is expressed in log scale so that the thicker the coating is applied, the more bend resistant the fiber will be. Consistent with other modeling results achieved, when the refractive index of the coating materials was lowered, the bending insensitivity is further improved. Coating thickness is one important factor needs to be considered for improving the fiber bending performance. On the other hand, when the low index coating gets thicker more cladding modes get trapped in the fiber. These cladding modes can impair the system performance in certain applications when strict single mode operation is required while in some other applications the requirements are less stringent. Therefore, in some embodiments, the low index coating is formulated with low enough refractive index, for example less than −1.0% delta, and thin coating thickness, i.e., preferably less than 10 microns and more preferably less than 7 microns and most preferably between 3 and 5 microns.

For commonly used primary and secondary coating materials, attenuation is typically between 100 and 200 dB/m at 1550 nm, and it is expected that the preferred materials listed herein will have relatively similar attenuation properties. The attenuation is thus very high compared to the fiber core and cladding materials. However, since there is only very little of the fundamental mode optical power propagating in the coating, the attenuation plays very little role in the overall attenuation of the optical fibers. Even when attenuation is taken into account in the modeling, as shown in FIG. 4, there is negligible effect to the fiber bend performance.

With the use of a coating 14 which exhibits a depressed index delta, one concern that may be raised is that cladding modes could become trapped inside the fiber. However, we have found that such cladding modes can be removed by employing one or more high index coatings outside the coating 14 to remove the cladding modes. Making the thickness of the coating 14 relatively thin, i.e., less than 10 microns, more preferably less than 7 microns, and most preferably less than 5 microns the leaky mode loss within coating 14 can be increased to a factor of 10, 100 or even higher than that of the fundamental mode. Alternatively, a fiber having a low index coating 14 thereon may be spliced together with conventional standard single mode fiber such as Corning SMF-28® fiber which is then used as a pigtail fiber. The conventional SMF-28 fiber will serve as a mode filter to remove unwanted cladding modes so that a smaller amount of light in the cladding will not impair system performance and subsequent circuitry which decode the optical signals. In order to verify the mechanism illustrated by the theoretical modeling, a low index coating material was coated directly onto the cladding of a standard single-mode optical fiber. The low index material exhibited a −3% delta relative to the pure silica which is used to make the cladding. The thickness of the low index coating material was about 8 microns. A conventional urethane acrylate secondary coating 18 was further coated directly over the low index coating 14 at a thickness of about 32 microns. Because this experimental fiber did not employ a low modulus primary coating, the fiber was expected to have very poor microbending performance, which causes some difficulty in obtaining accurate data related to the macrobending loss which is described below. It is believed that the macrobend induced losses measured and reported below would have been much lower if a primary coating had been employed to protect against microbending. Because the fiber was coated with low index material, some cladding modes existed. In order to correctly retrieve the macrobending loss information of the fundamental core mode, we spliced 2-3 meters of SMF-28 fiber having standard commercial coating thereof onto both ends of the fiber under test so that we could launch the fundamental mode and remove the cladding modes excited in the fiber having low index coating thereon. We then measured the bend performance of the fiber with the low index coating in various diameters. For comparison, we also measured a commercial SMF-28® fiber, which has the same mode field diameter as the fiber having low index coating thereon.

Figure 3:
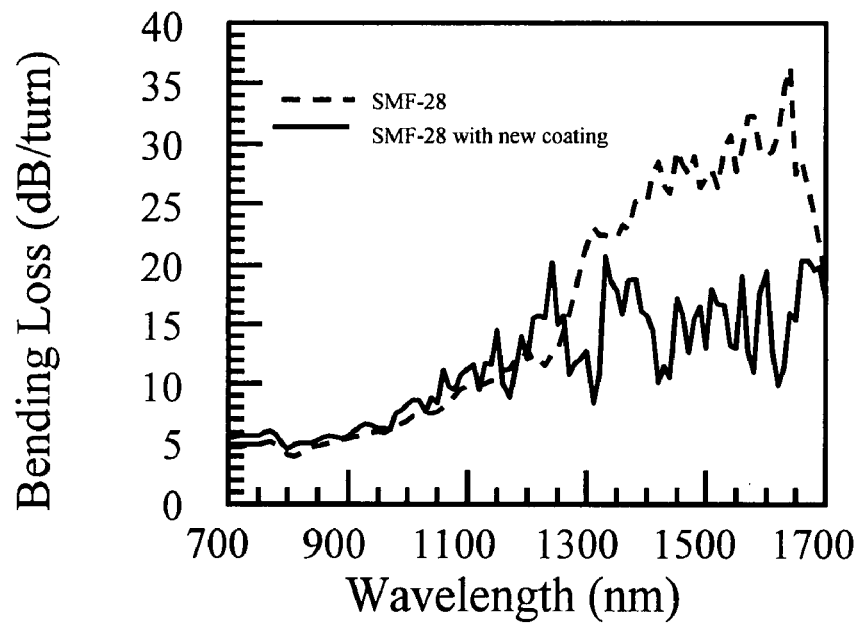
FIG. 3 illustrates bend loss of conventional single mode fiber compared to a fiber comprising a low index coating in accordance with the invention.

We then measured the bending loss as a function of wavelength using Photon Kinetics attenuation measurement bench, which allows us to obtain results over a very wide range of wavelengths. The results, illustrated in FIG. 3, show that at a bend diameter of 6 mm in the vicinity of 1550 nm the fiber with low index coating exhibits significant improved bending loss of around 20 dB/turn compared to commercially available standard single mode (e.g SMF-28e®), which exhibited about 28 dB/turn loss.

One advantage of this kind of structure is that the thickness of the added coating can be very thin so that the cladding modes will be highly leaky and will not have negative effect in interfering with the fundamental mode transmitted at the core of the fiber. From a different point of view the added low index layer and the conventional high index primary coating can in together act like a new primary coating but the thinner and inner layer can play the role of reducing the macrobending sensitivity of the fiber through optical means.

In another preferred embodiment, one replaces the conventional primary coating with a low index primary coating while keeping most or all of the mechanical property of the material so that the primary coating can still maintain its conventional property of protecting the fiber. In one preferred situation, the primary coating maintains its conventional role so that it has a thickness of, for example, 30 μm so that it can protect the fiber from microbending loss. In another preferred situation, the thickness of the primary coating can be adjusted so that it is optimal from the view of minimizing the macrobending and microbending loss.

We expect that the coating solution described herein can be applied to a variety of situations which can improve the conventional fibers, or enable new specialty fibers. For example, the improvement of bending property can be particular effective for fibers with smaller diameter, such as 80 micron diameter fiber (i.e., the outermost glass cladding is 80 microns diameter) used for a number of applications including gyroscope or erbium doped fiber in EDFA for compact packaging, since the bending improvement is more effective when the low index coating is positioned closer to the fiber core. Using a thicker low index coating 14 on a glass optical fiber having a diameter less than 100 microns can enable the use of conventional fiber handling tools such as fiber holders, connectors, and splicers. For example, by employing a coating having a thickness of greater than 10 microns (eg. 20 microns) on a glass optical fiber having a diameter less than 100 microns, more preferably less than 90 microns (e.g 80 or 85 microns), the result when the additional primary secondary coatings are applied is a coated optical fiber having approximately the same outer diameter (between 240 and 260 microns, more preferably about 250 microns) as a conventional coated optical fiber.

The coating material for coating 16 may be the polymerization product of any suitable conventional primary coating composition. A number of suitable primary coating compositions are known in the art and others are continually being developed. Typically, such conventional primary coating compositions contain a high concentration of one or more oligomeric components (e.g., polyether urethane acrylate oligomers, polyester urethane acrylate oligomers, polyurea urethane acrylate oligomers, polyether acrylate oligomers, polyester acrylate oligomers, polyurea acrylate oligomers, epoxy acrylate oligomer, and hydrogenated polybutadiene oligomers), one or more monomeric components as reactive diluents or cross-linking agents, adhesion promoters which promote adhesion of the primary coating to the underlying glass fiber, polymerization initiators, and other known additives.

It is preferred that the primary coating is a soft coating having a low Young's modulus. Preferably, the Young's modulus of the primary coating is not more than 3.0 MPa, more preferably the Young's modulus is not more than 1.5 MPa, most preferably the Young's modulus is not more than 1.0 MPa.

The secondary coating material 18 may be the polymerization (i.e., cured) product of a conventional secondary coating composition. The secondary coating material 18 can be a tight buffer coating or, alternatively, a loose tube coating. Irrespective of the type of secondary coating material employed, it is preferred, that the outer surface of the secondary coating material 18 not be tacky so that adjacent convolutions of the optical fiber (i.e., on a process spool) can be unwound.

It is preferred that the secondary coating has an outer surface with a coefficient of friction such that a spool of fiber can be freely and smoothly wound and rewound without causing fiber loops, fiber cross-overs, or other wind defects that impart local stresses to the fiber and lead to microbend induced attenuation losses. The coefficient of friction of the secondary coating is preferably less than about 0.43, more preferably less than about 0.38, and most preferably less than about 0.35.

The secondary coating preferably is a UV curable composition and not a thermoplastic composition. In one embodiment of the invention, the secondary coating composition includes an oligomeric component present in an amount of about 15 weight percent or less and a monomeric component present in an amount of about 75 weight percent or more. After curing, the cured product of the composition is characterized by a Young's modulus of at least about 650 MPa.

As used herein, the weight percent of a particular component refers to the amount introduced into the bulk composition, excluding other additives. The amount of other additives that are introduced into the bulk composition to produce a composition of the present invention is listed in parts per hundred. For example, an oligomer, monomer, and photoinitiator are combined to form the bulk composition such that the total weight percent of these components equals 100 percent. To this bulk composition, an amount of an additive, for example 1.0 part per hundred of an antioxidant, is introduced in excess of the 100 weight percent of the bulk composition.

A terpolymer consists of 40% N-pentafluorophenyl maleimide, 40% heptdecaflorodecyl acrylate and 20% glycidyl methacrylate has refractive index of 1.41 at 1550 nm. The terpolymer is dissolved in methyl ethyl ketone (20-40% wt) solution with the addition of 1.0% wt of triarylsulfonium hexafluoroantimonate as photo initiate and coated on the optical fiber at speed of 20-200 cm/s. 15-2 micron thick film was formed on the optical fiber and then the film can be UV cured at dosage of 2.0 J/cm or less and post cured at 100-120 C for 1-3 minutes.

The monomeric component can include a single monomer or it can be a combination of two or more monomers. Preferably, the monomeric component introduced into the composition of the present invention comprises ethylenically unsaturated monomer(s). While the monomeric component can be present in an amount of 75 weight percent or more, it is preferably present in an amount of about 75 to about 99.2 weight percent, more preferably about 80 to about 99 weight percent, and most preferably about 85 to about 98 weight percent.

Ethylenically unsaturated monomers may contain various functional groups which enable their cross-linking. The ethylenically unsaturated monomers are preferably polyfunctional (i.e., each containing two or more functional groups), although monofunctional monomers can also be introduced into the composition. Therefore, the ethylenically unsaturated monomer can be a polyfunctional monomer, a monofunctional monomer, and mixtures thereof. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers).

In general, individual monomers capable of about 80% or more conversion (i.e., when cured) are more desirable than those having lower conversion rates. The degree to which monomers having lower conversion rates can be introduced into the composition depends upon the particular requirements (i.e., strength) of the resulting cured product. Typically, higher conversion rates will yield stronger cured products.

Suitable polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. West Chester, Pa. and Photomer 4025 and Photomer 4028, available from Henkel Corp. (Ambler, Pa.)), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, Henkel Corp., and SR499, Sartomer Company, Inc.), propoxylated-trimethylolpropane triacrylate with propoxylation being 3 or greater, preferably ranging from 3 to 30 (e.g., Photomer 4072, Henkel Corp: and SR492, Sartomer), and ditrimethylolpropane tetraacrylate (e.g., Photomer 4355, Henkel Corp.); alkoxylated glyceryl triacrylates such as propoxylated glyceryl triacrylate with propoxylation being 3 or greater (e.g., Photomer 4096, Henkel Corp. and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, Henkel Corp., and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether (4 up) and the like (e.g., Photomer 3016, Henkel Corp.); and single and multi-ring cyclic aromatic or non-aromatic polyacrylates such as dicyclopentadiene diacrylate and dicyclopentane diacrylate.

The oligomeric component can include a single type of oligomer or it can be a combination of two or more oligomers. When employed, if at all, the oligomeric component introduced into the compositions of the present invention preferably comprises ethylenically unsaturated oligomers. While the oligomeric component can be present in an amount of 15 weight percent or less, it is preferably present in an amount of about 13 weight percent or less, more preferably about 10 weight percent or less. While maintaining suitable physical characteristics of the composition and its resulting cured material, it is more cost-effective and, therefore, desirable to prepare compositions containing preferably less than about 5 weight percent or substantially devoid of the oligomeric component.

When employed, suitable oligomers can be either monofunctional oligomers or polyfunctional oligomers, although polyfunctional oligomers are preferred. The oligomeric component can also be a combination of a monofunctional oligomer and a polyfunctional oligomer.

Di-functional oligomers preferably have a structure according to formula (I) below:

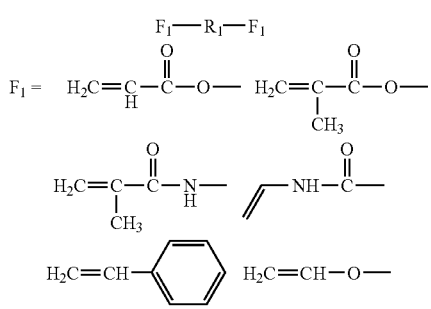

(I)

-continued $$H_2C=CH-O-\overset{O}{\underset{\|}{C}}-$$

where $F_1$ is independently a reactive functional group such as acrylate, methacrylate, acrylamide, N-vinyl amide, styrene, vinyl ether, vinyl ester, or other functional group known in the art; $R_1$ includes, independently, $-C_2\text{-}12$ $O-$, $-(C_2\text{-}4-O)_n-$, $-C_2\text{-}12$ $O-(C_2\text{-}4-O)_n-$, $-C_2\text{-}12$ $O-(CO-C_2\text{-}5$ $O)_n-$, or $-C_2\text{-}12$ $O-(CO-C_2\text{-}5$ $NH)_n-$ where n is a whole number from 1 to 30, preferably 1 to 10; $R_2$ is polyether, polyester, polycarbonate, polyamide, polyurethane, polyurea, or combinations thereof; and m is a whole number from 1 to 10, preferably 1 to 5. In the structure of formula I, the diisocyanate group is the reaction product formed following bonding of a diisocyanate to $R_2$ and/or $R_1$. The term "independently" is used herein to indicate that each $F_1$ may differ from another $F_1$ and the same is true for each $R_1$.

Other polyfunctional oligomers preferably have a structure according to formula (II), formula (III), or formula (IV) as set forth below:

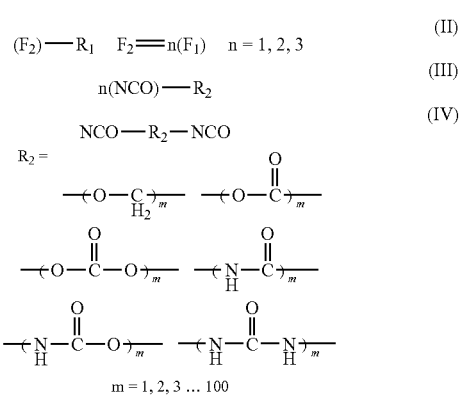

where $F_2$ independently represents from 1 to 3 functional groups such as acrylate, methacrylate, acrylamide, N-vinyl amide, styrene, vinyl ether, vinyl ester, or other functional groups known in the art; $R_1$ can include $-C_2\text{-}12$ $O-$, $-(C_2\text{-}4-O)_n-$, $-C_2\text{-}12$ $O-(C_2\text{-}4-O)_n-$, $-C_2\text{-}12$ $O-(CO-C_2\text{-}5$ $O)_n-$, or $-C_2\text{-}12$ $O-(CO-C_2\text{-}5$ $NH)_n-$ where n is a whole number from 1 to 10, preferably 1 to 5; R.sub.2 can be polyether, polyester, polycarbonate, polyamide, polyurethane, polyurea or combinations thereof; x is a whole number from 1 to 10, preferably 2 to 5; and m is a whole number from 1 to 10, preferably 1 to 5. In the structure of formula II, the multiisocyanate group is the reaction product formed following bonding of a multiisocyanate to $R_2$. Similarly, the diisocyanate group in the structure of formula III is the reaction product formed following bonding of a diisocyanate to $R_2$ and/or $R_1$.

The photoinitiator, when used in a small but effective amount to promote radiation cure, must provide reasonable cure speed without causing premature gelation of the coating composition. A desirable cure speed is any speed sufficient to cause substantial curing (i.e., greater than about 90%, more preferably 95%) of the coating composition. As measured in a dose versus modulus curve, a cure speed for coating thicknesses of about 25-35 µm is, e.g., less than 1.0 J/cm$^2$, preferably less than 0.5 J/cm$^2$.

Suitable photoinitiators include, without limitation, 1-hydroxycyclohexylphenyl ketone (e.g.,; Irgacure 184 available from Ciba Specialty Chemical (Tarrytown, N.Y.)), (2,6-diethoxybenzoyl)-2,4,4-trimethylpentyl phosphine oxide (e.g. in commercial blends Irgacure 1800, 1850, and 1700, Ciba Specialty Chemical), 2,2-dimethoxyl-2-phenyl acetophenone (e.g., Irgacure, 651, Ciba Specialty Chemical), bis(2,4,6-trimethylbenzoyl)phenyl phosphine oxide (e.g., Irgacure 819, Ciba Specialty Chemical), (2,4,6-triiethylbenzoyl) diphenyl phosphine oxide (e.g., in commercial blend Darocur 4265, Ciba Specialty Chemical), 2-hydroxy-2-methyl-1-phenylpropane-1-one (e.g., in commercial blend Darocur 4265, Ciba Specialty Chemical) and combinations thereof. Other photoinitiators are continually being developed and used in coating compositions on glass fibers. Any suitable photoinitiator can be introduced into compositions of the present invention.

In addition to the above-described components, the secondary coating composition of the present invention can optionally include an additive or a combination of additives. Suitable additives include, without limitation, antioxidants, catalysts, lubricants, low molecular weight non-crosslinking resins, adhesion promoters, and stabilizers. Some additives can operate to control the polymerization process, thereby affecting the physical properties (e.g., modulus, glass transition temperature) of the polymerization product formed formed the composition. Others can affect the integrity of the polymerization product of the composition (e.g., protect against de-polymerization or oxidative degradation).

A preferred antioxidant is thiodiethylene bis(3,5-di-tert-butyl)-4-hydroxyhydrocinnamate (e.g., Irganox 1035, available from Ciba Specialty Chemical).

A preferred adhesion promoter is an acrylated acid adhesion promoter such as Ebecryl 170 (available from UCB Radcure (Smyrna Ga.)).

Additional compositional information regarding suitable primary 16 and secondary 18 coatings can be found in U.S. Pat. Nos. 6,849,333 and 6,775,451, the specifications of which are hereby incorporated by reference in their entirety.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A glass optical fiber comprising a core and a cladding, said cladding having a refractive index $n_c$ a first coating directly contacting the cladding of said fiber, said coating having a thickness of less than 10 microns, said coating having a refractive index delta %=$100\times(n_t^2-n_c^2)/2n_t^2$ less than −1 percent.

2. The optical fiber of claim 1, wherein said first coating comprises a thickness of less than 7 microns.

3. The optical fiber of claim 1, wherein said first coating comprises a thickness of less than 5 microns.

4. The optical fiber of claim 1, wherein said coating comprises a terploymer containing N-halogenated phenyl maleimide unit or N-halogenated phenyl bismaleimide unit, one or more second units selected from the group consisting of halogenated acrylates, halogenated styrenes, halogenated vinyl ethers, halogenated olefins, halogenated vinyl isocyanates, halogenated N-vinyl amides, halogenated allyls, halogenated propenyl ethers, halogenated methacrylates, halogenated maleates, halogenated itaconates, and halogenated crotonates and one or more third units comprising a monomer containing both a free radically polymerizable group and cationic ring opening polymerizable group.

5. The optical fiber of claim 4, wherein said terploymer is prepared by radical co-polymerization prior to being applied to the fiber.

6. The optical fiber of claim 1, further comprising a second coating surrounding said first coating and having a Young's modulus less than about 200 MPa.

7. The optical fiber of claim 6, wherein said fiber further comprises a third coating surrounding said second coating, and having a Young's modulus of greater than about 600 MPa.

8. The optical fiber of claim 1, whereins said fiber exhibits a 20 mm bend induced loss of less than 0.12 dB/turn at 1550 nm.

9. The optical fiber of claim 1, wherein the core is single moded at at least one wavelength selected from the group consisting of 850, 1060, 1310, and 1550 nm.

10. The optical fiber of claim 1, wherein said fiber has an outer glass cladding diameter of less than 100 microns.

11. The optical fiber of claim 1, wherein said fiber has an outer glass cladding diameter of less than 90 microns.

12. An optical fiber comprising a core and a cladding, said cladding having a refractive index $n_c$ a first coating directly contacting the cladding of said fiber, said fiber comprising a glass diameter less than 100 microns, said coating having a thickness of at least 8 microns, said coating having a refractive index delta %=$100\times(n_t^2-n_c^2)/2n_t^2$ less than −1 percent.

13. The optical fiber of claim 12, wherein said fiber exhibits a glass diameter less than 90 microns.

14. The optical fiber of claim 12, wherein said coating exhibits thickness of at least 20 microns.

15. The optical fiber of claim 12, wherein said coating comprises a terploymer containing N-halogenated phenyl maleimide unit or N-halogenated phenyl bismaleimide unit, one or more second units selected from the group consisting of halogenated acrylates, halogenated styrenes, halogenated vinyl ethers, halogenated olefins, halogenated vinyl isocyanates, halogenated N-vinyl amides, halogenated allyls, halogenated propenyl ethers, halogenated methacrylates, halogenated maleates, halogenated itaconates, and halogenated crotonates and one or more third units comprising a monomer containing both a free radically polymerizable group and cationic ring opening polymerizable group.

16. The optical fiber of claim 15, wherein said terploymer is prepared by radical co-polymerization prior to being applied to the fiber.

17. The optical fiber of claim 12, further comprising a second coating surrounding said first coating and having a Young's modulus less than about 200 MPa.

18. The optical fiber of claim 12, wherein said fiber further comprises a third coating surrounding said second coating, and having a Young's modulus of greater than about 600 MPa.

19. The optical fiber of claim 12, wherein the core is single moded at at least one or more wavelengths selected from the group consisting of 850, 1060, 1310, and 1550 nm.

20. The optical fiber of claim 12, wherein said fiber exhibits a 20 mm bend induced loss of less than 0.12 dB/turn at 1550 nm.

* * * * *